June 9, 1931.  C. O. KNUUTI  1,809,044
DOVETAIL MEASURING DEVICE
Filed Feb. 4, 1929
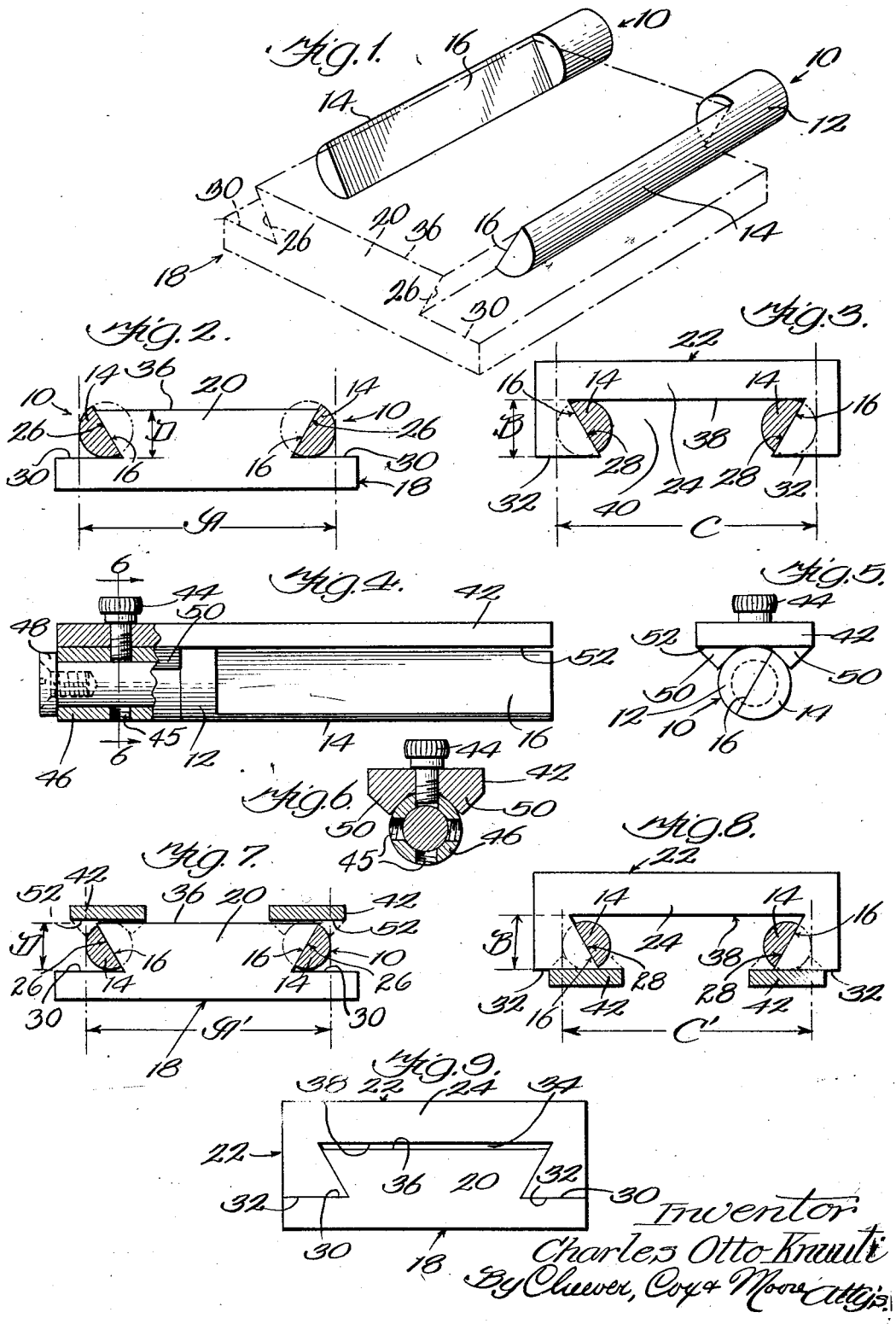
Inventor
Charles Otto Knuuti
By Cheever, Cox & Moore Attys Patented June 9, 1931

1,809,044

UNITED STATES PATENT OFFICE

CHARLES OTTO KNUUTI, OF BERWYN, ILLINOIS

DOVETAIL MEASURING DEVICE

Application filed February 4, 1929. Serial No. 337,311.

My invention relates to measuring devices and particularly to means for measuring dovetails and the like.

A difficult problem of dimensioning and measuring which is presented particularly in connection with machine shop practice, is that of accurately determining or measuring the distance between surfaces which are angularly disposed with respect to each other. Thus for example, in producing dovetail structures such as the type employed on cross slide carriages and the like, considerable difficulty has heretofore been experienced in measuring the distance between the inclined surfaces of the male and female dovetail elements. The character of the sliding fit between such parts is dependent upon the accuracy with which the cooperating surfaces are formed and methods of measuring which have heretofore been employed have in some instances required considerable mathematical calculations in order to obtain the desired degree of accuracy. Instruments which have in some instances been used for making direct readings have not only been very costly but have not enabled the measurement between dovetail surfaces with a degree of accuracy which is essential to the production of properly associated slidable machine elements.

It is one of the primary objects of my present invention to overcome the above mentioned and other difficulties which have heretofore been experienced and to this end I propose to provide a gauging or measuring device of very durable, simple and inexpensive construction which may be used in conjunction with conventional micrometers and other types of calipers so as to enable measurements to be made between angularly disposed surfaces within very close limits of accuracy.

Another object of my invention is to provide a gauging device as above set forth which is substantially self adjusting with respect to the angularly disposed surfaces to be measured and which permits identical measurements to be made between the opposed surfaces of male and female parts.

A still further object is to provide an improved gauging device which not only provides convenience and accuracy in making measurements between the opposed surfaces of dovetail structures but also provides an effective means for positively ascertaining whether sufficient clearance is present between the surfaces of the male and female parts which extend between the opposed bearing surfaces of said parts.

More specifically, my invention contemplates the provision of a gauging or measuring device which includes an elongated member having a flat and a cylindrical surface, the flat surface being adapted to rest against one of the surfaces of the work and the cylindrical surface being designed to receive the work engaging portion of a caliper such as a micrometer, said gauging device being so constructed and arranged as to permit identical measurements to be made for inside and outside dimensions.

These and other objects will be more apparent from the following detailed description when considered in connection with the accompanying drawings, wherein—

Figure 1 is a perspective view of a gauging device embodying features of my invention, the same being shown in association with the work which is shown in dot and dash outline;

Figure 2 is a transverse sectional view of the gauge members in association with the male section of a dovetail structure;

Figure 3 is a similar section disclosing the gauge members in association with the female section of said dovetail structure;

Figure 4 discloses a gauge member equipped with a flush bar;

Figure 5 is an end view of the device as viewed from the right of Figure 4;

Figure 6 is a transverse sectional view taken substantially along the line 6—6 of Figure 4;

Figure 7 is a transverse sectional view of a pair of gauges of the type shown in Figure 4 when used in connection with a male dovetail section;

Figure 8 discloses a similar section of the measuring device when used in association with the female dovetail section; and Figure 9 discloses the dovetail sections in operative relation for the purpose of more clearly disclosing the working clearance between said sections.

Referring now to the drawings more in detail wherein like numerals have been employed to designate similar parts throughout of the various figures, it will be observed that one embodiment of my invention includes a pair of identical units or gauging elements which I have designated generally by the numeral 10. These elements 10 comprise a cylindrical end or head portion 12 and an elongated semi-cylindrical portion 14 which is formed integral therewith as clearly shown in Figure 1. This semi-cylindrical portion or section 14 presents a substantially flat surface 16 which is adapted to be placed against a surface of the work to be measured.

For the purpose of illustrating one practical application of these gauging elements 10 I have disclosed the same in association with elements which are frequently employed in the construction of cross slides and the like. Thus in Figures 1 and 2 I have shown a guide 18 which is provided with a male dovetail section 20 and in Figure 3 I have shown a companion slide 22 which is formed with a female dovetail section 24. The dovetail section 20 is formed with angularly disposed external bearing surfaces 26 which co-operate with similar angularly disposed internal bearing surfaces 28 provided in the section 24. The guide 18 is also formed with bearing surfaces 30 which are adapted to slidably support companion bearing surfaces 32 of the slide 22 and when these members 18 and 22 are operatively associated as shown in Figure 9, it is common practice to have a clearance 34 presented between adjacent surfaces 36 and 38 of the sections 20 and 24 respectively. In the manufacture of these dovetail sections difficulty has been experienced in forming the angularly disposed surfaces 26 and the surfaces 28 with the desired degree of accuracy. Obviously, the accuracy with which these surfaces are formed will determine the characteristic of the sliding fit between the members 18 and 22.

With the foregoing description of the dovetail sections in mind it will now be apparent that the gauge members 10 may be very effectively employed to insure the proper measurement of the angularly disposed bearing surfaces. As clearly shown in Figures 1 and 2, the flat surfaces 16 of the gauging elements 10 may be brought into association with the surfaces 26 of the section 18 with the cylindrical external surface of the members 10 resting upon the bearing surfaces 30. With the members 10 occupying this position it is only necessary to span the distance indicated by the dimensional line (A), Figure 2, extending between diametrically opposed points on the cylindrical surface of either the section 14 or the section 12 of the members 10. To make such a measurement it is only necessary to employ calipering devices of conventional design such as the usual micrometer caliper.

After the above measurement has been made the gauge members 10 may be associated with the dovetail section 24 as clearly shown in Figure 3, with the flat gauge surfaces 16 resting against the internal angularly disposed bearing surfaces 28. The cylindrical surface of the sections 14 of the gauge members 10 should bear against the dovetail surface 38 as shown and in this connection it will be observed that the diameter of each of the gauge members 10 is equal to the depth of the dovetail recess 40, this depth being indicated by a dimensional line (B), Figure 3. With the gauge members 10 thus positioned, calipers may again be employed to span a distance indicated by a dimensional line (C). It will thus be apparent that the measurement for the external dimension (A) shown in Figure 2, will be identical with the measurement for the internal dimension (C) as shown in Figure 3. In this way outside calipers may be employed for making both of the measurements and these calipers may be of any conventional design.

Referring now to Figures 4 to 8 inclusive, it will be seen that the gauge members 10 may be slightly modified to support a flush bar 42. This flush bar may be secured in any suitable manner such as by means of a thumb screw 44 to a sleeve 46, Figures 4 and 6, a plurality of threaded apertures 45 being provided in the sleeve to permit of various adjustments thereof with respect to the bar 44. This sleeve 46 provides a bearing or mounting for the cylindrical end 12 of the gauge member 10, the portion of the end or head 12 extending through the sleeve 46 being reduced in diameter. A suitable tightening screw 48 may be threaded into the outer end of the reduced portion of the cylindrical end 12 so as to secure the sleeve or bushing 46 against outward displacement. In order to facilitate the positioning of the flush bar upon the sleeve 46 I provide suitable lugs 50 which are adapted to rest upon the outer surface of the sleeve 46 as clearly shown in Figures 5 and 6. The use of the flush bar 42 serves to facilitate the application of the gauge members 10 to the work as shown in Figures 7 and 8. In Figure 7 for example, the gauge members and companion flush bars are positioned in operative association with the dovetail section 20 of the guide 18. It will be noted that a surface 52 of each of the flush bars 42 may be substantially tangent to the peripheral or cylindrical surface of the gauge members 10 and the sleeve 46. When said surfaces 52 rest adjacent the surface 36 of the dovetail section 20 and the flat gauge surfaces 16 engage the companion angularly disposed surfaces 26, the peripheral or cylindrical surfaces of the gauge members should rest upon the bearing surfaces 30. In other words, the diameter of the gauge members may be equivalent to or less than the thickness of the dovetail section 20 as indicated by the dimension line (D), Figure 7. A calipering instrument may then be spanned across the distance indicated by a dimension line ($A^1$). This dimension ($A^1$) corresponds to the dimension (A) described in connection with Figure 2. To make the internal measurement of the dovetail section 24, Figure 8, it is only necessary to apply the gauging device with the flush bar surface 52 engaging the bearing surfaces 32 and the flat surfaces 16 of the members 10 engaging the angularly disposed internal bearing surfaces 28. A reading may then be taken across the external portions of the gauge members 10 as indicated by the dimension line ($C^1$). Thus the measurement of the distance indicated by the dimension ($C^1$) will be identical with the measurement of the distance indicated with the dimension ($A^1$). In other words, the same outside calipers may be employed for making both measurements. In Figure 3 the diameter of the gauge members 10 are shown to be substantially equal to the depth of the dovetail recess 40 while in Figures 7 and 8 the diameter of the members 10 are substantially equivalent to or less than the thickness of the male dovetail section 20 and hence less than the depth of the recess in the section 24. It is in many instances desirable to provide a certain amount of clearance between the surfaces 36 and 38 and by having the cylindrical gauge members of a diameter which is less than the dimension (B), it is very easy to determine whether sufficient clearance has been provided. In other words, when the surfaces 52 and 16 are carried into association with the surfaces 32 and 28 respectively, there must be a clearance between the cylindrical surface of the members 10 and the dovetail surface 38 in order that a reading can be taken. Thus, if the diameters of the gauge members 10 are made substantially equivalent to or less than the dimension (D) shown in Figure 7, which is the thickness of the male dovetail section, it is very easy to determine whether or not sufficient clearance 34 has been provided in the machining of the parts. In measuring the male dovetail section 20 it is sometimes desirable to remove the flush bar and this can be readily accomplished by loosening the thumb screw 44. By using flush bars as above described in association with the gauge members 10, a single gauge member may be used for measuring dovetails of various sizes, that is to say, the diameter of the gauge members 10 may vary considerably from the thickness of the male dovetail sections as indicated by the dimension (D) without affecting the accuracy in the measurements which are taken.

From the foregoing it will be understood that my invention contemplates the provision of a very simple yet durable measuring device which will serve to greatly falicitate the measurement of distances between angularly disposed surfaces and the like. The use of the flush bar is optional and the device may be designed as shown in Figures 4 and 5 so that when the flush bar is not employed, the same may be readily detached from the member 10. The use of a flush bar, however, enables a single gauge member to be used for measuring dovetail sections included within a rather wide range of sizes. Thus, the number of gauging devices required for shop use may be reduced to a comparatively small number. One of the important features which distinguishes my improved gauging devices from tools which have heretofore been employed for measuring dovetail surfaces and the like is that when in use an appreciable portion or cross section of the angularly disposed dovetail surfaces are engaged by the flat surface 16 of the gauge members 10. Thus in measuring the distance between surfaces by the use of my device the measurement is taken at a point substantially intermediate the angularly disposed surfaces. Discrepancies in the angularity of the angularly disposed surfaces some times result in the machining thereof and by the use of my improved device these errors will be automatically compensated for and a sliding fit between the sections will be obtained which is sufficient for all practical purposes regardless of the error caused during the machining process.

To more readily appreciate the full significance of my improved gauging device, I wish to draw a comparison between my so called "half-plug" method and the conventional "round-plug" method. The latter system requires the use of round or cylindrical plugs and the peripheral surfaces of these plugs are carried into contact with the angularly disposed work surfaces, as for example, dovetail surfaces. Obviously, in using the "round-plugs", a line contact is made at the point of tangency between the work and the surface of the plug, said line being positioned near the extreme portion or margin of the dovetail surface, when the conventional practice is followed of employing a round plug, the diameter of which is substantially equivalent to the height of dovetail being measured. Thus, any error in angularity which may be present at a point other than along the above mentioned line of contact, would not be detected.

If such error is in one direction, it would necessitate the removal of a considerable portion of stock to obtain a sliding fit, while an error in the opposite direction would present a very poor fit because the only bearing surface would be that portion along the margin of the dovetail surface. In either instance, the results would be decidedly unsatisfactory.

By employing my improved "half-plug" system, I am able to insure at least a fifty percent (50%) fit. That is to say, if the measurement which is read across the plugs is correct, at least one-half of the adjacent surfaces will make a proper sliding fit because the measurement is taken at a point which is substantially midway between the outer and inner margins of each dovetail surface. It is also to be noted that angular error is compensated for in all instances whether the error in one of the parts is identical with or different from the error in the companion part. In such instances, a portion of the adjacent surfaces must be scraped before the parts can be assembled. In other words, the parts cannot be fitted together until at least fifty percent (50%) bearing is obtained. This cannot be accomplished by using the so called "round-plug" system of measuring when a plug is employed which has a diameter substantially equal to the height of the dovetail.

In many instances a fifty percent sliding fit is sufficient and by the use of my improved device measurements may be taken which will insure at least a fifty percent fit if not better. Any scraping operation which might be necessary to finally fit the sections together is reduced to a minimum. As already suggested, my invention contemplates the provision of a device which enables the inside and outside measurements to be made by the use of a single instrument, namely, a conventional outside caliper or micrometer. A single measurement taken across the diametrically opposed points of the cylinder surfaces of the gauge members 10 is sufficient to ascertain the angular relationship with a desired degree of accuracy and this convenient method of measurement greatly expedites the manufacture of such parts.

My invention also provides a convenient method for dimensioning working drawings. By employing what might be termed "half plug gauges", namely, gauge members 10 having a semi-cylindrical portion of standard sizes, the circular ouline and size of these plugs or gauges may be shown and specified on the drawings so as to inform the workman of the proper dimensions. The simplicity and convenience of such dimensioning will be apparent when it is understood that by this system a workman need only observe a single dimension in preparing the dovetail section, namely, the dimension taken across the half plug or gauge surfaces as described. Heretofore it has been necessary for the workman to take inside and outside readings in order to obtain the required fit between round plugs and hence considerable time and effort has been expended in such instances in order to obtain the desired results. My improved "half plug method" provides a system of measurement which is exceedingly convenient and very accurate.

Obviously, my improved measuring or gauging device is not limited for use in connection with measurement between angularly disposed surfaces such as dovetail constructions but is adapted for many other uses as for example in measuring the distance from one surface to a point spaced therefrom. Although I have disclosed a specific embodiment of my invention for the purpose of illustrating one practical application thereof, it is to be understood that the invention is capable of many other modifications to suit the needs particularly incident to the use thereof, without departing from the spirit and scope of the appended claims.

Having thus described my invention, what I claim as new and wish to secure by Letters Patent is:

1. In a gauging device of the class described for use with angularly disposed surfaces, means including a substantially plane section having a surface for engaging a surface of the work to be measured, and a semi-cylindrical surface for receiving a work engaging portion of a calipering device, whereby the measurement between said work surface and another point may be accurately determined.

2. In a gauging device of the class described for use with angularly disposed surfaces, means having a semi-cylindrical section and a section which is a plane segment of a cylinder for engaging a surface of the work to be measured, said cylindrical surface being adapted when the device is associated with the work, to receive the work engaging portion of a calipering device, whereby the measurement between said work surface and another point may be accurately determined.

3. In a gauging device of the class described for use with angularly disposed surfaces, means having a cylindrical section and a section which is a plane segment of a cylinder extending longitudinally of said cylindrical section, said latter surface being designed for engagement with a surface of the work to be measured, the surface of said cylindrical section being adapted when the device is associated with the work, to receive the work engaging portion of a calipering device, whereby measurement between said work surface and another point may be accurately determined.

4. In a gauging device of the class described for use with angularly disposed surfaces, means having a semi-cylindrical section and a substantially plane section, the axes of the two sections being in alignment and also in the plane surface of the semi-cylindrical section, said latter surface being designed for engagement with a surface of the work to be measured, and the surface of said cylindrical section being designed to receive a work engaging portion of a calipering device.

5. In a gauging device of the class described for measuring the distance between a pair of spaced angularly disposed surfaces, means including a pair of gauge members, each of said members being provided with a substantially plane section for engaging the spaced surfaces of the work to be measured, and cylindrical surfaces adapted to be spanned by a suitable calipering device, whereby measurement between said work surfaces may be made.

6. In a device for measuring dovetail surfaces, means including a pair of elongated gauge members having a cylindrical section, and a plane section extending longitudinally thereof provided with a gauge surface, said latter surfaces of said gauge members being adapted for engagement with opposite angularly disposed surfaces of male and female dovetail sections, the cylindrical surfaces of said gauge members providing points between which a suitable calipering instrument may be placed.

7. In a gauging device of the class described for measuring angularly disposed surfaces, means having a flat surface for engaging a surface of the work to be measured, a cylindrical surface for receiving a work engaging portion of a calipering device, and another flat surface angularly disposed with respect to the first mentioned surface, whereby measurement between said work surface and another point spaced therefrom may be made.

8. In a gauging device of the class described for measuring angularly disposed surfaces, means having a cylindrical section and a section having a flat surface for engaging a surface of the work to be measured, said cylindrical surface being adapted when the device is associated with the work, to receive the work engaging portion of a calipering device, whereby measurement between said work surface and another surface may be made, and means positioned adjacent said first mentioned means having a flat surface which is angularly disposed with respect to the first mentioned flat surface.

9. In a gauging device of the class described for use with angularly disposed surfaces, means comprising a cylindrical section and a semi-cylindrical section, said semi-cylindrical section being provided with a surface for engaging a surface of the work to be measured, the cylindrical surface thereof being adapted when the device is associated with the work, to receive the work engaging portion of the calipering device, and a member extending longitudinally of and adjacent said cylindrical section, said member being provided with a surface for engaging a plane surface of the work, which is angularly disposed with the first mentioned surface of the work.

10. In a gauging device of the class described for use with angularly disposed surfaces, means comprising a cylindrical section and a semi-cylindrical section, said semi-cylindrical section having a surface for engaging a surface of the work to be measured, the cylindrical surface thereof being adapted when the device is associated with the work to receive the work engaging portion of a calipering device, whereby measurement between said work surface and another point may be made, and a member for rotatably supporting said cylindrical section, said member having a surface for engaging a plane surface of the work.

11. In a gauging device of the class described for measuring the distance between a pair of spaced angularly disposed surfaces, means including a pair of gauge members each of said members being provided with a substantially flat surface for engaging the spaced surfaces of the work to be measured, and a cylindrical surface adapted to be spanned by a suitable calipering device, whereby measurement between said work surfaces may be made, and a member associated with each of said gauge members having a flat surface for engagement with the work which is adapted to be angularly disposed with respect to the flat surface of said gauge members and to co-operate therewith in positioning said gauge members on the work surfaces.

12. In a gauging device of the class described for measuring angularly disposed surfaces, a member having a cylindrical surface and flat surface subtending said cylindrical surface, said surfaces being adapted for association with a surface of the work whereby measurement between said work surface and another work surface angularly disposed thereto may be made.

13. In a gauging device of the class described for measuring angularly disposed surfaces, a pair of gauging devices, each of said devices having a cylindrical surface and a flat surface subtending said cylindrical surface, the surfaces of one of said devices being adapted for association with one surface of the work and the surfaces of the other device being adapted for association with another surface of the work angularly disposed with respect to said first mentioned work surface, whereby measurement between said work surfaces may be accurately determined.

In witness whereof, I have hereunto subscribed my name.

CHARLES OTTO KNUUTI.